United States Patent
Haggenmüller et al.

(10) Patent No.: US 11,027,478 B2
(45) Date of Patent: Jun. 8, 2021

(54) THERMOFORM PACKAGING MACHINE AND METHOD OF FORMING-IN A FILM WEB INTO CARDBOARD ELEMENTS

(71) Applicant: MULTIVAC Sepp Haggenmüller SE & Co. KG, Wolfertschwenden (DE)

(72) Inventors: Martin Haggenmüller, Kempten (DE); Konrad Mößnang, Kempten (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 217 days.

(21) Appl. No.: 16/130,009

(22) Filed: Sep. 13, 2018

(65) Prior Publication Data

US 2019/0084212 A1  Mar. 21, 2019

(30) Foreign Application Priority Data

Sep. 15, 2017  (DE) .................... 10 2017 121 438.0

(51) Int. Cl.
*B29C 51/00*  (2006.01)
*B65B 47/02*  (2006.01)
(Continued)

(52) U.S. Cl.
CPC .......... *B29C 51/002* (2013.01); *B29C 51/162* (2013.01); *B31B 50/592* (2018.05);
(Continued)

(58) Field of Classification Search
USPC ....................................................... 493/175
See application file for complete search history.

(56) References Cited

U.S. PATENT DOCUMENTS 4,200,481 A * 4/1980 Faller .................... B29C 51/165
156/285
4,257,530 A * 3/1981 Faller .................... B29C 51/165
229/125.35
(Continued)

FOREIGN PATENT DOCUMENTS

DE  102011120949 A1  1/2013
EP  196799 A1  10/1986
(Continued)

OTHER PUBLICATIONS

European Opposition Dated Dec. 8, 2020 (with English Machine Translation), Objection No. EP3456641B1, Patent Proprietor: MULTIVAC Sepp Haggenmüller SE & Co. KG, Opponent: GEA Food Solutions Germany GmbH, 14 Pages.

*Primary Examiner* — Anna K Kinsaul
*Assistant Examiner* — Chinyere J Rushing-Tucker
(74) *Attorney, Agent, or Firm* — Brooks Kushman P.C.

(57) ABSTRACT

A thermoform packaging machine comprising a forming station. The forming station comprises at least one forming tool lower part, the forming tool lower part may be movable transversely to an operating direction of the thermoform packaging machine. The forming tool lower part may comprise at least one reception unit with one or a plurality of troughs for receiving cardboard elements. At a forming position the forming tool lower parts are in contact with the forming tool upper parts such that the first film web may be formed-in into the forming tool lower parts. Further, the first film web may be formed-in into the cardboard elements during the forming process and, in the case of a skin film, an adhering or an adhesive connection may be established between the skin film and the inner surfaces of the cardboard elements.

18 Claims, 3 Drawing Sheets

(51) Int. Cl.
  *B65B 47/08*    (2006.01)
  *B65B 11/52*    (2006.01)
  *B65B 47/10*    (2006.01)
  *B31B 50/59*    (2017.01)
  *B29C 51/16*    (2006.01)
  *B65B 9/04*     (2006.01)
  *B65B 41/12*    (2006.01)
  *B29K 311/12*   (2006.01)
  *B29L 31/00*    (2006.01)

(52) U.S. Cl.
  CPC .............. *B65B 9/04* (2013.01); *B65B 11/52* (2013.01); *B65B 41/12* (2013.01); *B65B 47/02* (2013.01); *B65B 47/08* (2013.01); *B65B 47/10* (2013.01); *B29K 2311/12* (2013.01); *B29L 2031/7162* (2013.01)

(56) References Cited

U.S. PATENT DOCUMENTS

| | | | | |
|---|---|---|---|---|
| 4,778,439 | A * | 10/1988 | Alexander | B29C 51/082 493/169 |
| 5,679,109 | A * | 10/1997 | Gies | B29C 66/7486 493/100 |
| 6,527,687 | B1 * | 3/2003 | Fortney | B26F 1/40 493/56 |
| 6,996,958 | B1 * | 2/2006 | Yeh | B65B 47/10 53/559 |
| 7,323,990 | B2 * | 1/2008 | Urban | B29C 43/18 340/539.13 |
| 7,481,640 | B1 * | 1/2009 | Jordan | B29C 51/20 425/110 |
| 7,607,279 | B2 | 10/2009 | Shackelford et al. | |
| 2004/0113329 | A1 * | 6/2004 | Martin | B29C 51/04 264/547 |
| 2004/0168774 | A1 * | 9/2004 | Nakagawa | B65B 15/04 156/556 |
| 2005/0103665 | A1 * | 5/2005 | Poirier | B65D 71/0096 206/386 |
| 2005/0150803 | A1 * | 7/2005 | Marroncles | B65D 83/38 206/503 |
| 2006/0163776 | A1 * | 7/2006 | Kato | B29C 45/1761 264/328.1 |
| 2012/0267036 | A1 * | 10/2012 | Bartoli | B29C 65/18 156/87 |
| 2013/0062400 | A1 * | 3/2013 | Meyer | B29C 51/162 229/120.02 |
| 2014/0135191 | A1 * | 5/2014 | Hubner | B65B 41/12 493/89 |
| 2015/0314541 | A1 * | 11/2015 | Krause | B29C 51/16 264/1.7 |
| 2015/0320263 | A1 * | 11/2015 | Van Puijenbroek | A23L 33/40 220/23.91 |
| 2017/0107006 | A1 * | 4/2017 | Bonneville | B65B 47/10 |

FOREIGN PATENT DOCUMENTS

| | | |
|---|---|---|
| EP | 1234765 A1 | 8/2002 |
| EP | 3009355 A1 | 4/2016 |
| EP | 3176101 A1 | 6/2017 |
| WO | 2013/004837 A1 | 1/2013 |
| WO | 2017001114 A1 | 1/2017 |

\* cited by examiner

THERMOFORM PACKAGING MACHINE AND METHOD OF FORMING-IN A FILM WEB INTO CARDBOARD ELEMENTS

CROSS-REFERENCE TO RELATED APPLICATIONS

This Application claims priority to German Patent Application No. 10 2017 121 438.0 filed on Sep. 15, 2017 to Martin Haggenmüller and Konrad Mößnang, currently pending, the entire disclosure of which is incorporated herein by reference.

FIELD OF THE INVENTION

The present invention relates to a thermoform packaging machine for forming-in a film into a cardboard element, and a method for making the package having a film formed-in into a cardboard element.

BACKGROUND OF THE INVENTION

U.S. Pat. No. 7,607,279 B2 discloses a thermoform packaging machine, in which a forming tool lower part can be removed laterally from the machine frame on guide rails for servicing a forming tool lower part or for replacing it by some other forming tool lower part.

Also EP 1234765 A1 discloses a thermoform packaging machine with a unit for exchanging forming and sealing tools not transversely to, but in the production direction or in a direction opposite to the production direction.

WO 2017001114 A1 discloses a further thermoform packaging machine for feeding cardboard trays into a die by means of a manipulator so as to introduce the die into the forming station so that a film web can be formed-in into the cardboard trays in the forming station. The die is filled with cardboard trays outside the machine frame and the die is supplied to the forming station by means of two successive and differently oriented movements. This thermoform packaging machine is provided for producing packages consisting of a cardboard tray lined with a film in the interior thereof, so that foodstuffs can be packed in a gastight manner and such that a long shelf life will be accomplished. This kind of thermoform packaging machine is disadvantageous insofar as its performance is limited through the time required for the feeding in and the introduction of the cardboard trays into the forming station.

SUMMARY OF THE INVENTION

It is the object of the present invention to provide an improved thermoform packaging machine for producing composite cardboard-plastic packages.

The thermoform packaging machine according to the present invention comprises a forming station, which comprises at least one forming tool lower part, the forming tool lower part being movable transversely to an operating direction of the thermoform packaging machine. The thermoform packaging machine according to the present invention may be characterized in that the forming tool lower part comprises at least one reception unit with one or a plurality of troughs for receiving therein a cardboard element or a group of cardboard elements, wherein, for forming-in a first film web into the forming tool lower part, the reception unit with the cardboard elements may be at a forming position. In this way, the first film web can be formed-in into the cardboard elements without the necessity of providing an additional work station for producing a composite cardboard-plastic package. The cardboard element provides a high degree of stability so that thin film webs, such as skin films, can be used for gastight packing even liquid or pasty foodstuffs. This will reduce the amount of film consumed and simultaneously allows for the provision of a visually very attractive and stable package.

Preferably, the forming tool lower part comprises two reception units, so that one of these reception units can be filled with cardboard elements while the other reception unit still takes part or already takes part in the forming process, so as to prevent a reduction of the cycle output of the thermoform packaging machine. One reception unit may be positionable at an infeed position laterally beside a machine frame of the thermoform packaging machine while the other reception unit may be at the forming position.

Preferably, the forming tool lower part may be movable between the infeed position and a stand-by position, in one embodiment by means of a change-over drive, so as to integrate this change of position in the automated machine cycle. If necessary, the forming tool lower part can be raised from its stand-by position to its forming position.

According to a particularly advantageous embodiment, two forming tool lower parts may be provided, which are movable in opposite directions to one another and transversely to the operating direction, in one embodiment using a power drive. In this way, a high cycle output of the thermoform packaging machine can be achieved, since a respective forming tool lower part can be charged with new cardboard elements in each work cycle on each side of the machine and weight compensation may be accomplished for the common lifting device by the forming tool lower parts projecting laterally beyond the machine frame.

The two forming tool lower parts may be preferably arranged in succession in the conveying direction. In particular, they may be arranged in immediate succession, so that, when seen in the conveying direction, a first forming tool lower part may be located ahead of a second forming tool lower part. Each of the two forming tool lower parts may have two areas, which, in turn, each comprise one or a plurality of troughs for receiving therein cardboard elements. When seen in a top view, the two areas of the forming tool lower parts are juxtaposed transversely to the conveying direction, i.e. they can be referred to as right and left areas of the respective forming tool lower part. At a first moment in time, the right area of the first forming tool lower part may be at its stand-by position while the left area of the first forming tool lower part may be at its infeed position on the packaging machine side constituting the left side in the conveying direction, and can there be charged with cardboard elements. At the same moment in time, the left area of the second forming tool lower part may be at its stand-by position while the right area of the second forming tool lower part may be at its infeed position on the right side of the packaging machine, and can be charged with cardboard elements at this infeed position. It follows that, on both sides of the packaging machine, a respective area can be charged, viz. the left area of the first forming tool lower part and the right area of the second forming tool lower part.

By executing oppositely directed movements transversely to the conveying direction of the thermoform packaging machine, the two forming tool lower parts are subsequently moved such that the two areas, which previously occupied the stand-by position, are moved outwards while the two areas connected thereto, which previously occupied their infeed position, are simultaneously moved to their stand-by position. More concretely, the first forming tool lower part may be moved to the right while the second forming tool lower part may be simultaneously moved to the left, in both cases seen in the conveying direction. The areas of the two forming tool lower parts, which are now at their infeed position, can now be charged with new cardboard elements before the two forming tool lower parts are returned to their original position, again by oppositely directed movements transversely to the conveying direction.

Preferably, the reception units are arranged in a stationary manner on a common die plate, so as to have two almost identically producible components, which are applied to the die plate in such a way that a gap will be formed between them, into which parts of the machine frame can be moved, without any collision being caused, during an upward vertical lifting movement.

According to an advantageous embodiment, the forming station comprises a lifting device for the forming tool lower part and the lifting device extends beyond at least one side of the machine frame, so that an uneven distribution of weight of the forming tool lower part can be taken up more effectively.

Preferably, the lifting device may extend beyond the machine frame on both sides.

According to an advantageous embodiment, the forming station may be configured for forming-in the first film web into the cardboard elements located in the forming tool lower part, such that a connection will be established between the film web and the cardboard elements, thus allowing composite cardboard-plastic packages to be already provided for the subsequent processes along the thermoform packaging machine.

The present invention may include a method according to the present invention used for forming-in a film web into cardboard elements located in the forming tool lower part comprises the steps of feeding the cardboard elements into troughs of a reception unit of the forming tool lower part at an infeed position outside the machine frame, power moving the reception unit then transversely to the operating direction to the stand-by position in the forming station, moving the forming tool lower part then upwards using a lifting device to its forming position into contact with a forming tool upper part and, subsequently, forming-in the film web into the troughs of the reception unit and into the cardboard elements, respectively.

Preferably, in one embodiment, a reception unit may be charged with cardboard elements at the infeed position outside the machine frame while another reception unit may be at the forming position, so as to prevent a negative influence on the cycle output of the thermoform packaging machine by the process of feeding in cardboard elements prior to the forming process.

According to an advantageous embodiment of the method, two forming tool lower parts of the forming station are arranged in succession in the operating direction. Each forming tool lower parts are moved between the infeed position and the stand-by position, preferably simultaneously and in opposite directions to one another, so as to achieve a maximum output of producible packages per unit time.

According to a first advantageous embodiment, cardboard trays are removed by means of a manipulator from a feed belt as cardboard elements and fed into the troughs of the reception units individually or in groups.

According to a second advantageous embodiment, a cardboard blank may be fed into a trough of the reception unit as a cardboard element in such a way that a cardboard tray will be formed during the infeed process.

Other aspects and advantages of the present invention will be apparent from the following detailed description of the preferred embodiments and the accompanying drawing figures.

DESCRIPTION OF THE SEVERAL VIEWS OF THE DRAWINGS

In the following, embodiments of the present invention will be explained in more detail making reference to a drawing, in which the individual figures show.

DETAILED DESCRIPTION OF THE INVENTION

Figure 1:
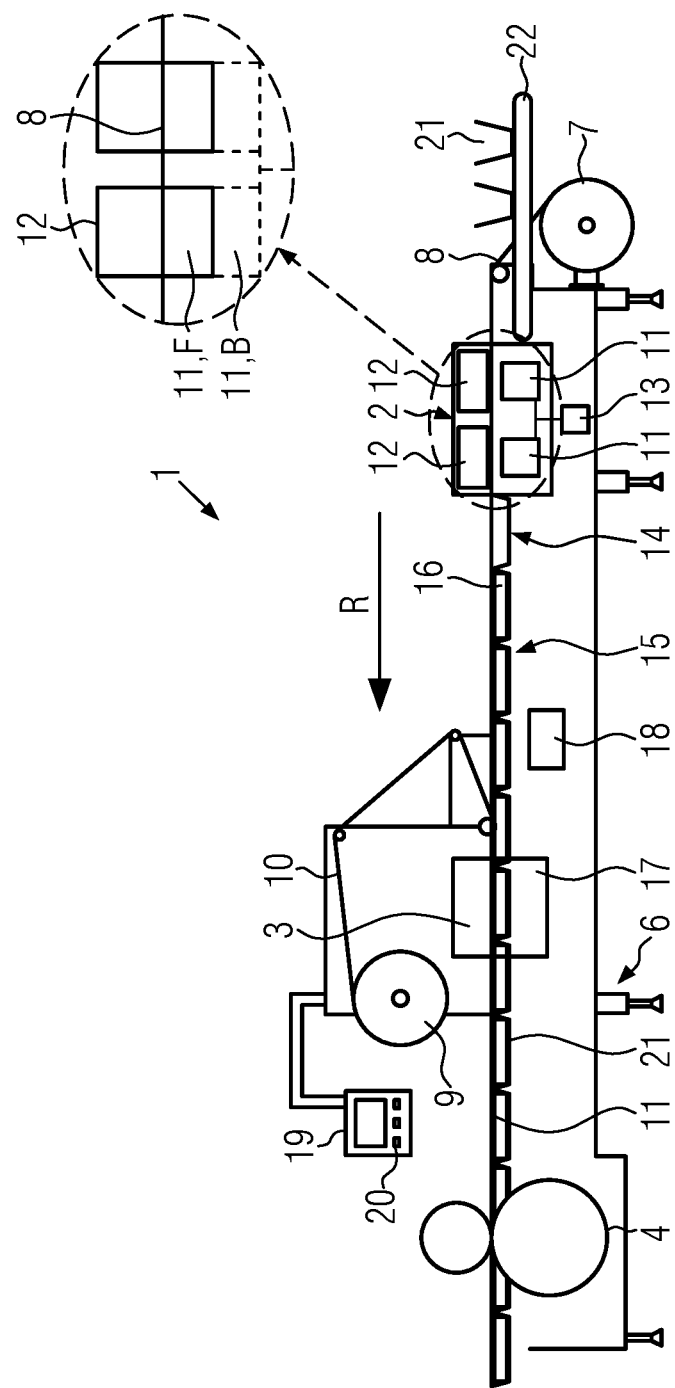
FIG. 1 is a schematic side view of one embodiment of a thermoform packaging machine in accordance with the teachings of the present disclosure.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows in a schematic view a thermoform packaging machine 1. This thermoform packaging machine 1 comprises a forming station 2, a sealing station 3 and a cutting station 4 arranged, in this sequence, in an operating direction R on a machine frame 6. On the input side, the machine frame 6 has provided thereon a supply roll 7, from which a first film/foil web 8 is unwound. In the area of the sealing station 3, a material storage unit 9 is provided, from which a second film/foil web 10 is unwound as a cover film. Furthermore, the packaging machine 1 comprises a feeding device, which is not shown, said feeding device gripping the first film web 8 and advancing it intermittently in the operating direction R during a main work cycle. The feeding device may be realized, for example, by laterally arranged conveyor chains.

In the embodiment shown, the forming station 2 is configured as a thermoforming station, in which containers 14 are formed into the first film web 8 by thermoforming. The forming station 2 may here be configured such that, in the direction perpendicular to the operating direction R, a plurality of troughs 14 is formed side by side. The machine is thus a multitrack machine. Downstream of the forming station 2, when seen in the operating direction R, an infeed line 15 is provided, along which the containers 14 formed into the first film web 8 are filled with a product 16.

The sealing station 3 is provided with a closable chamber 17, in which the atmosphere in the containers 14 can be substituted, prior to sealing, by an exchange gas or an exchange gas mixture, for example, by gas flushing.

The cutting station 4 is configured for cutting or perforating the film webs 8, 10 between the containers 14. Here, the invention may provide that the containers 14 are separated from one another directly after a cutting process, i.e. that they can only be advanced individually. However, the invention may also provide that the containers 14 can still be advanced in common directly after the cutting operation.

The thermoform packaging machine 1 is additionally provided with a controller 18. The latter is used for controlling and monitoring the processes taking place in the packaging machine 1. A display device 19 with operating controls 20 serves to make the sequences of process steps in the packaging machine 1 visible to an operator and to influence them by the operator.

In the embodiment shown, the forming station 2 comprises two forming tool lower parts 11, which are displaceable laterally to the operating direction R and which cooperate with two forming tool upper parts 12 for the respective forming process. The two forming tool upper parts 12 may also be configured as a common forming tool upper part. For a vertical movement of the forming tool lower parts 11, a common lifting device 13 is provided, so that the forming tool lower parts 11 can be moved between a stand-by position B and a forming position F, as shown in the enlarged detail in FIG. 1. At the forming position F, which may also be referred to as upper position, the forming tool lower parts 11 are in contact with the forming tool upper parts 12 such that the first film web 8, in one embodiment a skin film, can be formed-in into the forming tool lower parts 11. The stand-by position is a lower position at which the forming tool lower parts 11 can laterally be moved out of the machine frame 6 to an infeed position E (see FIG. 2) for being there charged with cardboard elements 21. The cardboard elements 21 are moved up to the forming station 2 via a feed belt 22 for manual or automated feeding into the forming tool lower parts 11. The first film web 8 is formed-in into the cardboard elements 21 during the forming process and, in the case of a skin film, an adhering or an adhesive connection can be established between the skin film and the inner surfaces of the cardboard elements 21. This composite material is thus jointly advanced as a container 14 in the operating direction R when the forming station 2 has been opened.

Figure 2:
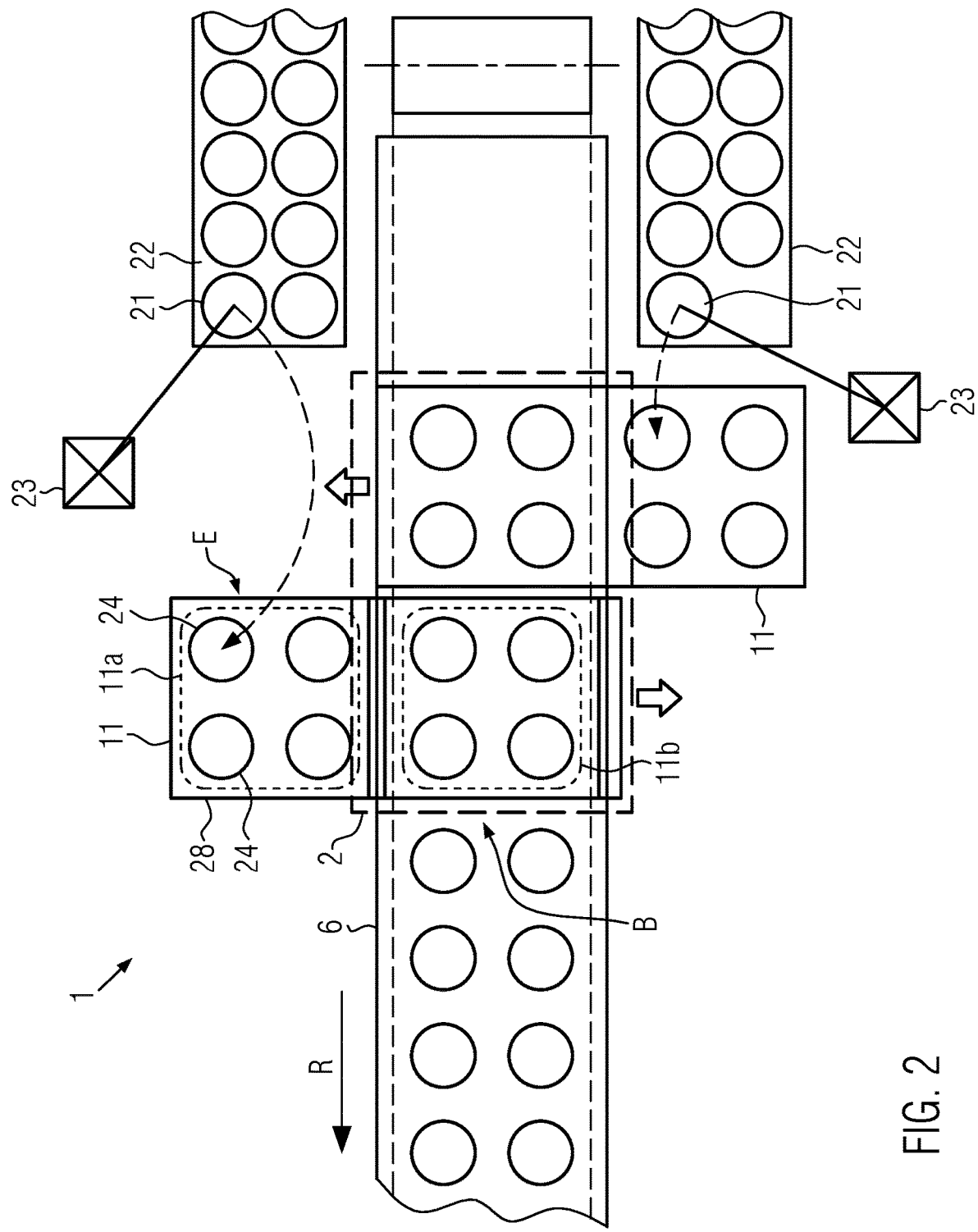
FIG. 2 is a schematic top view of one embodiment of a thermoform packaging machine in accordance with the present disclosure showing the area of the forming station.

FIG. 2 shows a top view of the thermoform packaging machine 1 with the forming station 2, the respective forming tool lower parts 11 being here movable orthogonally to the operating direction R, cf. the arrows. The forming tool lower parts 11 each comprise two reception units 11a, 11b. The reception units 11a, 11b are applied to a die plate 28 or configured as an integral component. In the example shown, each reception unit 11a, 11b is provided for receiving therein four cardboard elements 21 and for producing four containers 14, respectively.

The cardboard elements 21 are fed by means of two feed belts 22 arranged on both sides of the thermoform packaging machine 1 and are removed, individually or in groups, from the feed belt 22 by means of a respective manipulator 23, for example, a scara or delta robot, and fed into the reception units 11a, 11b and troughs 24 in the forming tool lower parts 11, the reception units 11a, 11b projecting laterally beyond a side 6a of the machine frame 6 and occupying their infeed position E. As soon as the two forming tool lower parts 11 have been filled and the forming process of the forming station 2 has been finished, both forming tool lower parts 11 are power moved in opposite directions by means of a change-over drive 27, which is shown in more detail in FIG. 3. When the reception unit 11a with the cardboard elements 21 has reached its stand-by position B in the forming station 2, it can be raised to its forming position F by means of the lifting device 13, so as to be moved into contact with the forming tool upper part 12 for the next forming process.

Figure 3:
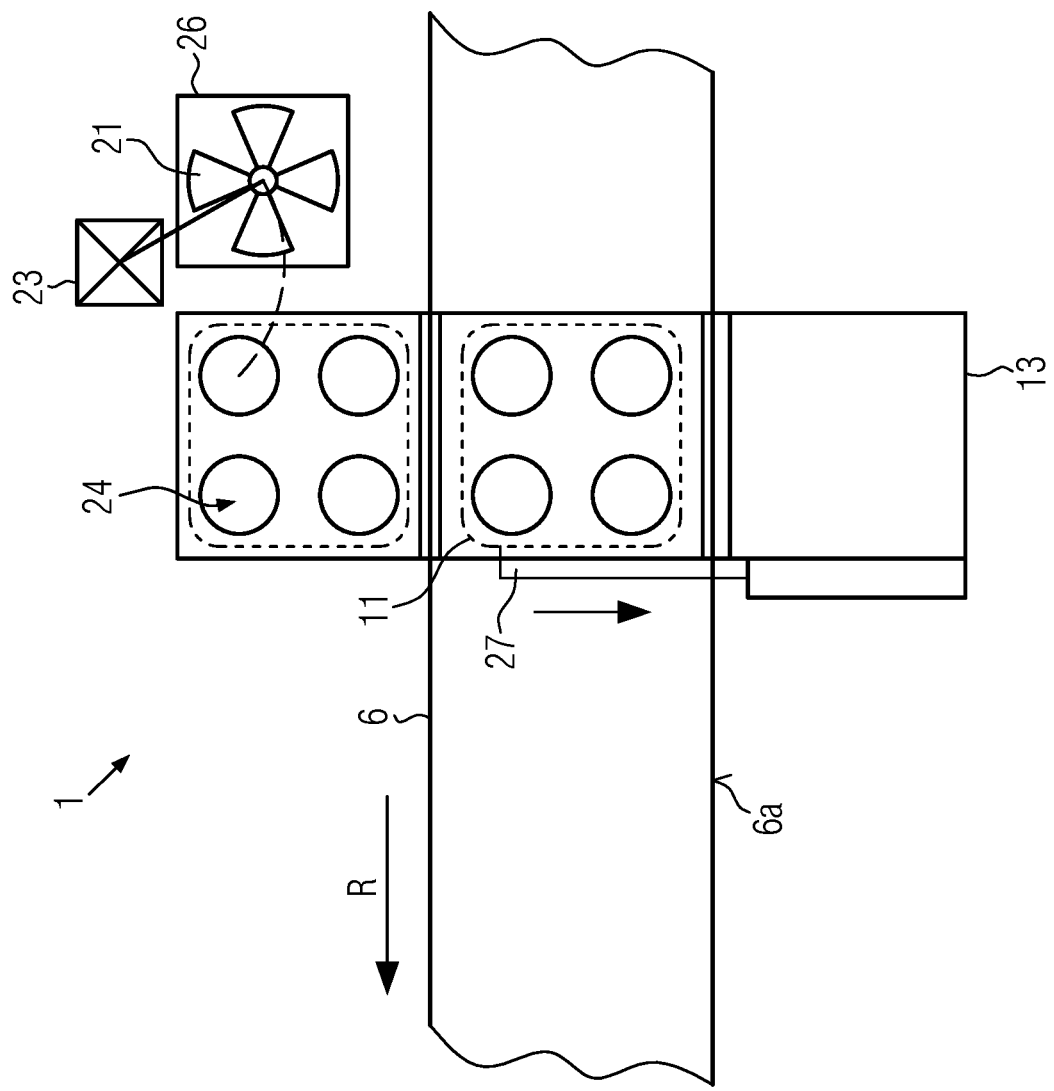
FIG. 3 is a schematic top view of another embodiment of a thermoform packaging machine in accordance with the present disclosure.

FIG. 3 shows a variant of the thermoform packaging machine 1 comprising only one forming tool lower part 11, the lifting device 13 being oriented transversely to the operating direction R and projecting on one side or, as shown here, on both sides beyond the machine frame 6. The cardboard elements 21 shown in FIG. 3 have not yet been folded and are provided via a stacking device 26 and fed into the troughs 24 by the manipulator 23. The folding of the cardboard elements 21 takes place here during the movement with which the cardboard element 21 is pushed into the trough 24.

Details of the embodiment variants according to FIGS. 2 and 3 can be combined with one another.

The cardboard element 21 may be provided in an unfolded condition or in an already folded condition.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A thermoform packaging machine comprising:
   a forming station having a forming tool lower part, the forming tool lower part being disposed for movement in a direction transverse to an operating direction of the thermoform packaging machine;
   wherein the forming tool lower part comprises two reception units that each have one or a plurality of troughs, and each trough is configured for receiving therein a respective cardboard element;

wherein one reception unit is positionable at an infeed position laterally beside a machine frame of the thermoform packaging machine, while the other reception unit is at a forming position;

wherein, when the one reception unit with the cardboard element or cardboard elements is at the forming position, a first film web is formable into the forming tool lower part to form one or more containers in the first film; and wherein the thermoform packaging machine is operable to transport the one or more containers out of the forming station in the operating direction.

2. The thermoform packaging machine according to claim 1, wherein the forming tool lower part is movable between the infeed position and a stand-by position using a change-over drive.

3. The thermoform packaging machine according to claim 1, further comprising an additional forming tool lower part, wherein the forming tool lower part and the additional forming tool lower part are disposed for movement in opposing directions to one another and in a direction transverse to an operating direction of the thermoforming packaging machine using a change-over drive.

4. The thermoform packaging machine according to claim 1, wherein the two reception units are arranged in a stationary manner on a common die plate.

5. The thermoform packaging machine according to claim 1, wherein the forming station comprises a lifting device for the forming tool lower part and the lifting device extends beyond at least one side of the machine frame of the thermoforming packaging machine.

6. The thermoform packaging machine according to claim 5, wherein the lifting device extends beyond the machine frame on both sides of the machine frame.

7. The thermoform packaging machine according to claim 1, wherein the forming station is configured for forming-in the first film web into the cardboard element or cardboard elements located in the forming tool lower part, such that a connection will be established between the film web and the cardboard element or cardboard elements.

8. A method of forming-in a film web into cardboard elements located in a forming tool lower part of a thermoform packaging machine, the method comprising:

feeding the cardboard elements into troughs of a first reception unit of the forming tool lower part at an infeed position outside a machine frame of the thermoform packaging machine, while a second reception unit of the forming tool lower part is at a forming position in a forming station;

moving the first reception unit in a direction transverse to an operating direction of the thermoform packaging machine to a forming position in the forming station;

moving the forming tool lower part in an upward direction into contact with a forming tool upper part using a lifting device;

forming-in the film web into the troughs of the first reception unit after the moving the forming tool lower part in an upward direction step to form containers in the film web; and moving the containers out of the forming station in the operating direction.

9. The method according to claim 8, further comprising arranging an additional forming tool lower part in succession with the forming tool lower part in the operating direction, wherein the additional forming tool lower part is movable between an infeed position in the forming position; and moving each of the forming tool lower parts between the infeed position and the forming position.

10. The method according to claim 9, wherein the moving the each of the forming tool lower parts between the infeed position and the forming position step comprises moving the forming tool lower parts simultaneously and in opposite directions to one another.

11. The method according to claim 8, further comprising removing one or more cardboard elements from a feed belt using a manipulator; and feeding one or more cardboard elements into the troughs of the reception units individually or in groups.

12. The method according to claim 8, further comprising forming a cardboard tray from a cardboard blank that is fed into a trough of the first reception unit as a cardboard element during an infeed process of the forming station.

13. A thermoform packaging machine comprising:

a forming station including first and second forming tool lower parts that are moveable in opposing directions relative to one another and in a direction transverse to an operating direction of the thermoforming packaging machine using a change-over drive;

wherein each forming tool lower part includes at least one reception unit having one or more troughs that are each configured to receive a respective cardboard element; and wherein, when a reception unit of the at least one reception unit of one of the forming tool lower parts is positioned at a forming position, with a cardboard element received in each of the one or more troughs, the forming station is configured to form a first film web into the one forming tool lower part.

14. The thermoform packaging machine according to claim 13, wherein each forming tool lower part is movable transversely to the operating direction to move the at least one reception unit of the forming tool lower part between an infeed position, for receiving a cardboard element in each of the one or more troughs, and a stand-by position.

15. The thermoform packaging machine according to claim 14, wherein for each of the at least one reception unit of each forming tool lower part, the infeed position is a position at which the at least one reception unit is positioned laterally beside a machine frame of the thermoform packaging machine.

16. The thermoform packaging machine according to claim 14, wherein for each of the at least one reception unit of each forming tool lower part, the stand-by position is a position at which the at least one reception unit is positioned beneath a forming tool upper part of the thermoform packaging machine.

17. The thermoform packaging machine according to claim 14, wherein each forming tool lower part is movable vertically to move the at least one reception unit of the forming tool lower part from the stand-by position toward a respective forming tool upper part of the thermoform packaging machine.

18. The thermoform packaging machine according to claim 13, wherein each forming tool lower part includes two reception units that each have multiple troughs, and each trough is configured to receive a respective cardboard element.

\* \* \* \* \*